United States Patent [19]

Kanagawa et al.

[11] Patent Number: 5,712,692
[45] Date of Patent: Jan. 27, 1998

[54] DRIVING POWER UNIT FOR DRIVING LIQUID CRYSTAL DISPLAY ELEMENT AND LIQUID CRYSTAL LIGHT-MODULATING DEVICE

[75] Inventors: Yutaka Abe Kanagawa; Takao Yamaguchi; Masahiko Ikeda; Morio Sato; Hiroshi Tazaki, all of Kanagawa, Japan

[73] Assignee: Kabushiki Kaisha Pilot, Tokyto-to, Japan

[21] Appl. No.: 496,389

[22] Filed: Jun. 29, 1995

[30] Foreign Application Priority Data

Nov. 30, 1994 [JP] Japan ................... 6-321271
Jan. 26, 1995 [JP] Japan ................... 7-029961

[51] Int. Cl.⁶ .................................................. G02F 1/33
[52] U.S. Cl. ............... 348/790; 345/104; 368/242; 349/110; 349/84; 349/89
[58] Field of Search ............... 348/790; 395/52; 178/18; 345/104; 379/74, 84; 368/242; 330/112; 349/110, 84, 89

[56] References Cited

U.S. PATENT DOCUMENTS

| | | | |
|---|---|---|---|
| 3,974,636 | 8/1976 | Kamiya ................... | 368/242 |
| 5,111,316 | 5/1992 | Noble et al. ................... | 359/52 |
| 5,115,330 | 5/1992 | Noble et al. ................... | 359/52 |
| 5,117,297 | 5/1992 | Nobile et al. ................... | 359/52 |
| 5,136,404 | 8/1992 | Nobile et al. ................... | 359/52 |
| 5,351,143 | 9/1994 | Sato et al. ................... | 359/51 |

FOREIGN PATENT DOCUMENTS

| | | | |
|---|---|---|---|
| 281530 | 2/1993 | Japan ................... | G02F 1/1333 |
| 224182 | 3/1993 | Japan ................... | G02F 1/1333 |
| 1016 | 3/1983 | WIPO ................... | B01J 13/00 |

*Primary Examiner*—Glenton B. Burgess
*Attorney, Agent, or Firm*—Darby & Darby

[57] ABSTRACT

A driving power unit for a liquid crystal display element, which charges an electrostatic charge on the surface of the liquid crystal display element having at least a conductive layer and a liquid crystal-dispersed polymer layer in which a liquid crystal is finely dispersed into a polymer matrix, has a blocking oscillator circuit for boosting a low voltage generated by a low-voltage DC power source, a rectifier diode for rectifying the voltage boosted by the blocking oscillator circuit, a smoothing capacitor for being charged by application of the rectified voltage and smoothing an output voltage, and a resistance interconnected between the smoothing capacitor and an output terminal to control an output current value to 5 mA or less. A liquid crystal light-modulating device has a driving power unit and a liquid crystal light-modulating panel including a pair of electrodes at least one of which is transparent or translucent, and a liquid crystal-dispersed polymer layer sandwiched between the electrodes.

18 Claims, 3 Drawing Sheets

DRIVING POWER UNIT FOR DRIVING LIQUID CRYSTAL DISPLAY ELEMENT AND LIQUID CRYSTAL LIGHT-MODULATING DEVICE

BACKGROUND OF THE INVENTION

1. Field of the Invention

The present invention relates to a driving power unit for driving a liquid crystal display (LCD) element. More particularly, the present invention relates to a driving power unit for charging a surface of an LCD element with electrostatic charges, and the LCD element is capable of displaying and erasing images by using a liquid crystal-dispersed polymer layer which optionally allows transmission and scattering of light by making use of the electro-optical effect to change the light scattering condition of a liquid crystal depending on the presence or absence of electrostatic fields.

Further, the present invention relates to a liquid crystal light-modulating device with a liquid crystal-dispersed polymer layer which optionally allows transmission and scattering of light by making use of the electro-optical effect to change the light scattering condition of a liquid crystal depending on the presence or absence of electrostatic fields.

2. Description of the Related Art

A great number of proposals have been conventionally made with regard to LCD elements making use of the electro-optical effect of a liquid crystal and to LCD devices having such an LCD element. Of these, LCD devices with a liquid crystal-dispersed polymer layer, in which liquid crystals are finely dispersed into a polymer matrix, have been a recent concern because they permit comparatively easy production of a light and large screen requiring neither a polarizing plate nor a orientation film.

For example, Japanese Patent Publication No. Hei 3-52843 proposes a liquid crystal light-modulating panel in which a liquid crystal-dispersed polymer layer is sandwiched between two transparent electrodes. In this liquid crystal light-modulating panel, nematic liquid crystals or the like are finely dispersed into an aqueous solution of a water-soluble polymer such as polyvinyl alcohol, which is then dried to form a liquid crystal-dispersed polymer layer. To drive the liquid crystal light-modulating panel, the liquid crystal-dispersed polymer is sandwiched between these two transparent electrodes and then alternating current voltage is applied between the electrodes by an alternating current voltage power unit to change the orientation of the liquid crystal molecules in the liquid crystal-dispersed polymer layer into the direction of the electric field. This driving method is common to various conventional LCD elements, and the liquid crystal light-modulating panel described above is not the only one that uses it.

In Japanese Patent Laid-open No. Hei 5-224182, there is disclosed an LCD element of externally charging type comprising a transparent high electric resistance layer, a liquid crystal-dispersed polymer layer in which liquid crystals are finely dispersed into a polymer matrix, and a transparent insulator layer layered in order on a conductive layer.

Further, in Japanese Patent Laid-open No. Hei 5-281530, there is also disclosed, a hand-writable liquid crystal board set including the above-described LCD element, which comprises a display means for applying an electrostatic charge to the surface of a transparent insulator layer from outside, an erasing means for removing the electrostatic charge on the surface thereof, and a power unit for producing a surface potential on the surface of the transparent insulator layer. With this liquid crystal board set, images can be readily displayed or erased repeatedly on the screen by applying or removing the electrostatic charge on the surface of the transparent insulator layer with the displaying means or the erasing means.

The LCD element of externally charging type includes a transparent high electric resistance layer having a high volume resistivity. To increase the volume resistivity of the liquid crystal-dispersed polymer layer allows the electric field applied between the conductive layer and the surface of the transparent insulator layer of the LCD element to be kept without flowing as a current and thus it is possible to maintain the orientation of the liquid crystal molecules in the liquid crystal-dispersed polymer layer in the direction of the electric field. It is, however, necessary to apply a relatively high direct current voltage in order to display an image or images on the LCD element with the orientation of the liquid crystal molecules. Consequently, it is impossible to obtain a continuous written line on the display screen when the conventional driving power unit making use of a low AC voltage for the LCD element is used as a power unit for driving the LCD element of externally charging type.

In connection with this, there have been also proposed the above-described hand-writable liquid crystal board set with this LCD element of externally charging type. However, since this "hand-writable liquid crystal board set" is considered to be provided for the market as a toy, the conventional DC voltage power unit cannot be satisfied in view of the dimension of the power unit, the size, the costs and the like. While a dry battery is suitable for the primary power source of the DC voltage power unit because of its good availability and easiness of handling, it is necessary to reduce power consumption of the DC voltage power unit as small as possible in order to elongate the life of the dry battery and to reduce the frequency of replacement.

As mentioned above, well known in the art are liquid crystal light-modulating device comprising: a liquid crystal light-modulating panel in which an LCD device is interposed between two electrodes, the LCD device having a liquid crystal-dispersed polymer layer in which a liquid crystal is finely dispersed into a polymer matrix; and an alternating current voltage power source for applying an alternating current voltage between the electrodes of the liquid crystal light-modulating panel, wherein the alternating current voltage is applied between the electrodes to change the orientation of the liquid crystal molecules in the liquid crystal-dispersed polymer layer into the direction of the electric field and to change the scattering condition of light incident upon the liquid crystal light-modulating panel.

However, in this liquid crystal light-modulating panel, the liquid crystal-dispersed polymer layer has a low volume resistivity, particularly in a humid condition. The liquid crystal light-modulating panel is maintained transparent only with the application of the voltage to the liquid crystal-dispersed polymer layer. Upon stopping the application of the voltage, the orientation of liquid crystals in the liquid crystal-dispersed polymer layer returns to its former condition and thus the liquid crystal light-modulating panel turns opaque accordingly. In other words, there is no memory characteristic, and it is required to continue applying the alternating current voltage in order to continuously maintain the transparent condition. Such a liquid crystal light-modulating panel is disadvantageous by the economic considerations.

Further, in the conventional liquid crystal light-modulating panel, when direct current flows through the liquid crystal layer or the liquid crystal-dispersed polymer layer, reaction occurs between the electrode and the liquid crystals. Consequently, a phenomenon occurs that the electrodes and the liquid crystals deteriorate. To prevent this from happening, the liquid crystal light-modulating panel should be driven with AC voltage that the respective average values of electric currents in both directions are equal rather than DC voltage. However, it is difficult to produce such a stable current. Further, any change in an area of the liquid crystal light-modulating panel requires to change the circuit itself.

SUMMARY OF THE INVENTION

Accordingly, it is an object of the present invention to provide a driving power unit which is usable for a liquid crystal display element having a high volume resistivity and high image memory characteristics and which is simple in structure, is cost-effective, consumes less electric current, and is excellent in safety.

It is another object of the present invention to provide a liquid crystal light-modulating device comprising a liquid crystal light-modulating panel which has memory characteristics maintaining a transparent state and is capable of obtaining electro-optical effect by instantaneous application of DC voltage, and a driving power unit for applying the DC voltage to the liquid crystal light-modulating panel, wherein the driving power unit is simple in structure, is cost-effective, and consumes less electric current.

According to one aspect of the present invention, there is provided a driving power unit for driving a liquid crystal display element which charges an electrostatic charge on a surface of the liquid crystal display element having at least a conductive layer and a liquid crystal-dispersed polymer layer in which a liquid crystal is finely dispersed into a polymer matrix, the driving power unit comprising a low-voltage DC power source; a power switch; a blocking oscillator circuit for boosting a low voltage generated by the low-voltage DC power source; a rectifier diode for rectifying the voltage boosted by the blocking oscillator circuit; a smoothing capacitor for being charged by application of the rectified voltage and smoothing an output voltage; and a resistance interconnected between the smoothing capacitor and an output terminal to control an output current value to 5 mA or less.

According to another aspect of the present invention, there is provided a liquid crystal light-modulating device, comprising: (A) a liquid crystal light-modulating panel comprising a pair of electrodes at least one of which is transparent or translucent, and a liquid crystal-dispersed polymer layer sandwiched between the electrodes, wherein a liquid crystal is finely dispersed into a polymer matrix; and (B) a driving power unit for applying a direct current voltage between the electrodes and driving the liquid crystal light-modulating panel, comprising a low-voltage DC power source, a power switch, a blocking oscillator circuit for boosting a low voltage generated by the low-voltage DC power source, a rectifier diode for rectifying the voltage boosted by the blocking oscillator circuit, and a smoothing capacitor for being charged by application of the rectified voltage and smoothing an output voltage.

DESCRIPTION OF THE PREFERRED EMBODIMENTS

Figure 1:
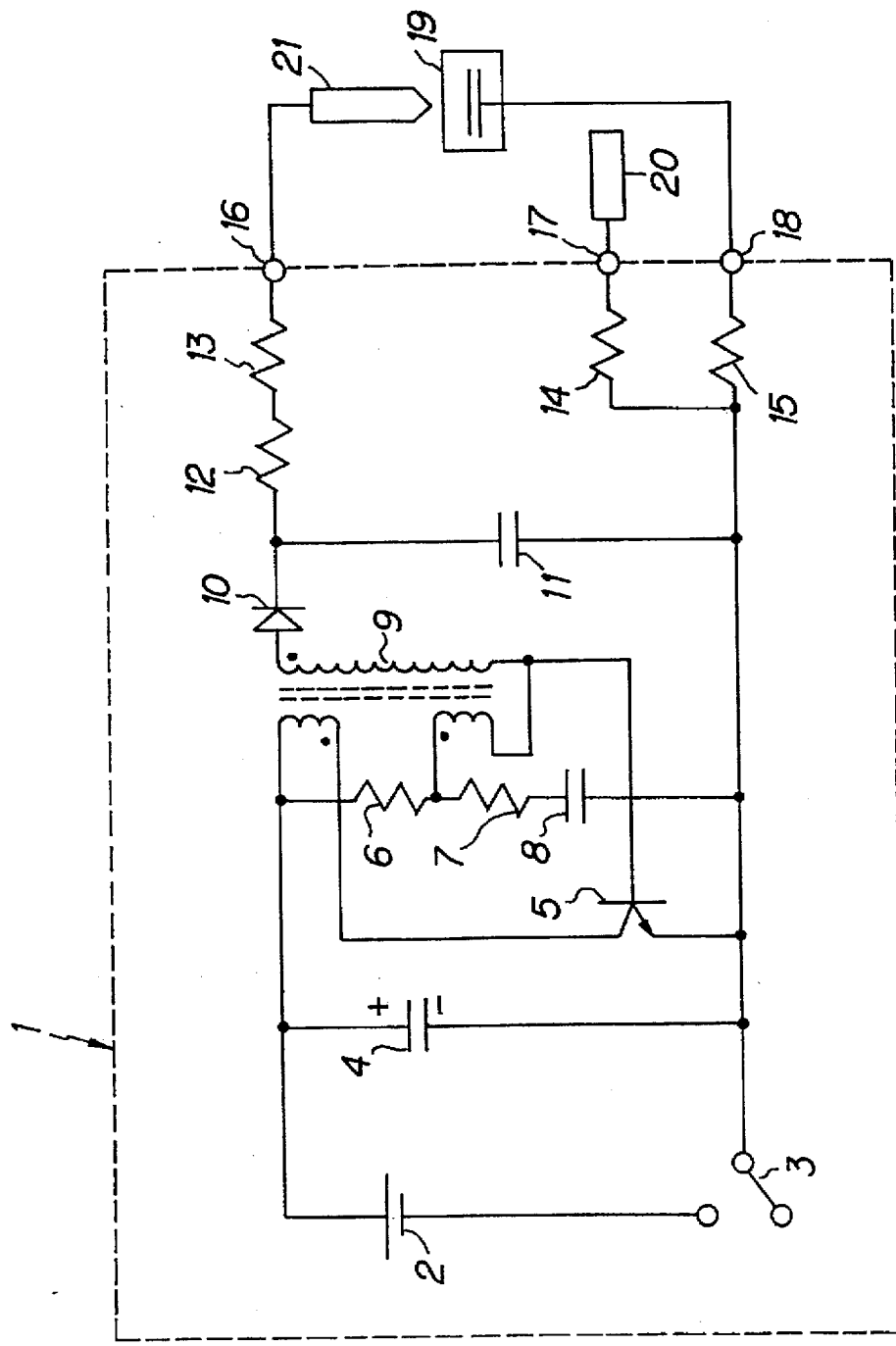
FIG. 1 is a circuit diagram of a driving power unit for driving a liquid crystal display element according to an embodiment of the present invention, illustrating the configuration thereof used in practice.

A driving power unit for driving an LCD element according to the present invention is to charge an electrostatic charge on a surface of an LCD element having at least a conductive layer and a liquid crystal-dispersed polymer layer in which a liquid crystal is finely dispersed into a polymer matrix. One output terminal of the driving power unit is connected to the conductive layer and an output terminal having the equal electrical potential to the above output terminal is electrically connected to an erasing means, and the other output terminal is electrically connected to a writing means.

The driving power unit for driving an LCD element according to the present invention mainly comprises a low-voltage DC power source, a power switch, a blocking oscillator circuit for boosting a low voltage generated by the low-voltage DC power source, a rectifier diode for rectifying the voltage boosted by the blocking oscillator circuit, a smoothing capacitor for being charged by application of the rectified voltage and smoothing the output voltage, and a resistance interconnected between the smoothing capacitor and an output terminal to control an output current value to 5 mA or less. The blocking oscillator circuit substantially comprises an oscillating transistor and an oscillating transformer for boosting and is to boost a low voltage produced by the low-voltage DC power source to a level ranging from 50 to 2,000 V. Further, the current flowing through the primary coil of the oscillating transformer for boosting is controlled to a level of 10 mA or less.

The conductive layer of the LCD element connected to the driving power unit of the present invention is either transparent or opaque and is formed of a material having a surface resistance of $10^7$ $\Omega/\square$ or less. This material may be a metallic or metallic alloy foil, or may be obtained by making a surface or an entire body of a plastic or glass substrate be conductive with a conductive material such as metals, metallic alloys, metal oxides, black lead and conductive polymers.

The liquid crystal, which is finely dispersed into the polymer matrix of the liquid crystal-dispersed polymer layer, is a nematic liquid crystal having a positive dielectric anisotropy.

In the driving power unit used for the LCD element made of the above-described materials, a dry battery, a solar battery or the like may be used as the low voltage power source, and a dry battery of 1.5 V is preferable because of its good availability and easiness of handling.

The oscillating transistor, the oscillating transformer for boosting and the rectifier diode are those commercially available and are not specific ones. In addition, in the oscillating transformer for boosting, the winding number ratio of the primary coil to that of the secondary coil is determined depending on the relation between the input voltage and the desired output voltage.

The smoothing capacitor used is a capacitor having a capacity suitable for the rectified voltage. For example, where the present driving power unit is used for a hand-writable liquid crystal board set, one terminal of the driving power unit is connected to the conductive layer of the LCD element and the other terminal is connected to a writing means made of a conductive material, and writing operation is conducted by charging the electric charge on the surface of the LCD element with the writing means while keeping a switch ON. In this event, a stable result of writing can be obtained when the voltage is applied with the smoothing capacitor, even during the writing operation at a high speed.

It is said, in general, that the amount of the current safe for a human body causing no electric shock is 5 mA or less. With this respect, the resistance is connected in order to control the output current from the smoothing capacitor to the level of 5 mA or less, and the resistant value is preferably in the range of from 200 KΩ to 100 MΩ in view of the relation with the materials described above.

With the driving power unit for driving LCD devices according to the present invention which has the configuration described above, oscillation occurs through repetition of following three steps, thereby generating in the secondary coil a pulse-like voltage proportional to the ratio of winding number of the primary coil to that of the secondary coil:

(1) In response to the turning ON of the power switch, a current flows from the low-voltage DC power source to the primary coil connected to the collector of the oscillating transistor, and the current is induced in the coil connected to the base, increasing the current flowing through the collector.

(2) At a certain time instant, the saturation voltage between the collector and the emitter rapidly increases, dropping the voltage applied to the primary coil connected to the collector. This turns OFF the oscillating transistor. At this time the current is induced in the secondary coil by the energy accumulated in the oscillating transformer (core) for boosting.

(3) The current is again induced in the coil connected to the base due to the current induced in the secondary coil, which turns ON the oscillating transistor to flow the current through the primary coil connected to the collector.

The pulse-like voltage is half-wave rectified and is accumulated in the capacitor.

One output terminal of the capacitor is connected to the conductive layer and the erasing means of the LCD element through the resistances, and the other output terminal is connected to the writing means through the resistance. In this configuration, writing and erasing is conducted on the display screen of the LCD element with the writing means and the erasing means, respectively. In this event, even if a current flows through the human body, the current is controlled by the resistance to the level of 5 mA or less.

Here, when the driving power unit for driving a liquid crystal display element is employed as a driving power unit of the aforesaid hand-writable liquid crystal board set, the driving power unit may be installed in a body case constituting the hand-writable liquid crystal board, a display means, which is formed into a pen type, for applying electrostatic charges on a display screen or the like.

Furthermore, when the driving power unit for driving a liquid crystal display element is installed in the display means of a pen type, one terminal of the driving power unit is connected with a pen point thereof and the other terminal of the driving power unit is electrically connected with a portion of the pen which is held by a hand.

Next, the liquid crystal light-modulating device according to the present invention comprises: (A) a liquid crystal light-modulating panel comprising a pair of electrodes at least one of which is transparent or translucent, and a liquid crystal-dispersed polymer layer sandwiched between the electrodes, wherein a liquid crystal is finely dispersed into a polymer matrix; and (B) a driving power unit for applying a direct current voltage between the electrodes and driving the liquid crystal light-modulating panel, comprising a low-voltage DC power source, a power switch, a blocking oscillator circuit for boosting a low voltage generated by the low-voltage DC power source, a rectifier diode for rectifying the voltage boosted by the blocking oscillator circuit, and a smoothing capacitor for being charged by application of the rectified voltage and smoothing an output voltage.

In the liquid crystal light-modulating panel according to the present invention, the liquid crystal-dispersed polymer layer is formed by means of finely dispersing the liquid crystal into the polymer matrix, and it is important that the volume resistivity of the liquid crystal-dispersed polymer layer is $10^{13}$ Ω·cm or more in 20° C. air at a relative humidity of 90%. The reason is that, at the value less than the above, the applied electric charge is not kept between the upper and lower sides of the liquid crystal-dispersed polymer layer and flows as the current, so that the memory characteristics maintaining the orientation condition of the liquid crystal cannot be obtained. The liquid crystal-dispersed polymer layer, in which the liquid crystal is finely dispersed in the polymer matrix in a state of independent liquid drops, improves the volume resistivity of the liquid crystal-dispersed polymer layer and is used advantageously.

Examples of the polymer used for the liquid crystal-dispersed polymer layer include vinyl resins such as chlorinated polyethylene, polypropylene, polystyrene, and acrylic resins, vinylidene chloride resins, polyvinyl acetal resins, cellulose resins, ionomers, polyamide, polycarbonates, polyphenylen oxides, polysulfones, fluororesins, silicone resins, styrene-butadiene rubbers, chlorosulfonated polyethylene, polyester, and epoxy resins. The polyvinyl acetal resins may be, for example, polyvinyl formal, polyvinyl acetal, polyvinyl butylal and so on.

When a polymer having a cross-linking structure (referred to as a cross-linked polymer hereinafter) is used as the polymer matrix for the liquid crystal dispersed polymer layer, this cross-linked polymer exhibits no compatibility with the liquid crystal even when the liquid crystal light-modulating panel of the present invention is placed in a high temperature environment, maintaining a stable structure in which the liquid crystal is finely dispersed. This means such a liquid crystal light-modulating panel is available that has the durability without no deterioration in performance with time.

Cross-linked polymers can be obtained such that one of a silicone polymer and a polymer having at least one functional group selected from the group consisting of a double bond, nitrile, mercapto, hydroxy, carboxy, epoxy, chloro, fluoro, isocyanate, methoxy, amino and chlorosulfonyl is mixed with a cross-linking agent reactive with the functional group to cause a reaction between them, or such that one of the polymers having the aforementioned functional group is mixed with a reactive polymer to cause a reaction between them.

Examples of the cross-linking agent used for the above reaction include organic peroxides, amine compounds, aziridine compounds, epoxy compounds, dicarboxylic acid or carboxylic acid anhydrides, formaldehyde, dialdehyde, diol, bisphenol, silanol compounds, metal oxides, metal halides, and optical cross-linking agent (optical polymerization initiator). Examples of the reactive polymer include phenol resins, amino resins, polyisocyanate, polyol, and epoxy resins.

The preferable cross-linked polymer is a cross-linked polymer formed by reacting di- or polyisocyanate with a polymer such as a polyvinyl acetal resin, an epoxy resin, an acrylic resin having a functional group such as a hydroxy group and a carboxy group, a polyester resin and a fluoro resin. The more preferable cross-linked polymer is a cross-linked polymer obtained by means of reacting di- or polyisocyanate with a polyvinyl acetal resin. The polyvinyl acetal resin may be, for example, polyvinyl formal, polyvinyl acetal, or polyvinyl butylal.

The liquid crystal used for the present invention is preferably a nematic liquid crystal having the positive dielectric anisotropy. A preferable liquid crystal phase is required to be stable at a temperature ranging from −10° to 100° C. in view of practical use of the light-modulating panel. In addition, the liquid crystal phase used preferably has birefringence Δn of 0.2 or more to improve the cloudiness during the OFF state. A dichroic dye may be added depending on the applications.

It is preferable that in the liquid crystal light-modulating panel according to the present invention, a transparent high electric resistance layer is provided between the liquid crystal-dispersed polymer layer and the electrodes, and the transparent high electric resistance layer has a volume resistivity of $10^{13}$ Ω·cm or more in 20° C. air at a relative humidity of 90%. Thus, when the transparent high electric resistance layer is sandwiched between the liquid crystal-dispersed polymer layer and the electrode, the electric charge is prevented from moving from the electrodes to the liquid crystal-dispersed polymer layer. Accordingly, it becomes possible to improve the memory characteristics. On the other hand, when the volume resistivity is $10^{13}$ Ω·cm or less in 20° C. air at a relative humidity of 90%, the electric charge is not sufficiently prevented from moving, so that the memory characteristics cannot be improved.

The transparent high electric resistance layer may be obtained by applying a solution of a layer material, or applying a solution of a reactive material and then reacting the same. Alternatively, the transparent high electric resistance layer may be obtained by means of laminating a film having high electric resistance with an adhesive or a bonding agent. The thickness of the transparent high electric resistance layer is preferably in the range of from 0.4 to 10 μm.

Examples of the polymer used for the transparent high electric resistance layer include vinyl resins such as chlorinated polyethylene, polypropylene, polystyrene, and acrylic resins, vinylidene chloride resins, polyvinyl acetal resins; cellulose resins, ionomers, polyamide, polycarbonates, polyphenylen oxides, polysulfones, fluororesins, silicone resins, styrene-butadiene rubbers, chlorosulfonated polyethylene, polyester, and epoxy resins. The polyvinyl acetal resins may be, for example, polyvinyl formal, polyvinyl acetal, polyvinyl butylal and so on.

In addition, the following cross-linked polymers may also be used. Cross-linked polymers can be obtained such that one of a silicone polymer and a polymer having at least one functional group selected from the group consisting of a double bond, nitrile, mercapto, hydroxy, carboxy, epoxy, chloro, fluoro, isocyanate, methoxy, amino and chlorosulfonyl is mixed with a cross-linking agent reactive with the functional group to cause a reaction between them, or such that one of the polymers having the aforementioned functional group is mixed with a reactive polymer to cause a reaction between them.

Examples of the cross-linking agent used for the above reaction include organic peroxides, amine compounds, aziridine compounds, epoxy compounds, dicarboxylic acid or carboxylic acid anhydrides, formaldehyde, dialdehyde, diol, bisphenol, silanol compounds, metal oxides, metal halides, and optical cross-linking agent (photopolymerization initiator). Examples of the reactive polymer include phenol resins, amino resins, polyisocyanate, polyol, and epoxy resins.

The preferable cross-linked polymer is a cross-linked polymer formed by reacting di- or polyisocyanate with a polymer such as a polyvinyl acetal resin, an epoxy resin, an acrylic resin having a functional group such as a hydroxy group and a carboxy group, a polyester resin and a fluoro resin. The more preferable cross-linked polymer is a cross-linked polymer obtained by means of reacting di- or polyisocyanate with a polyvinyl acetal resin. The polyvinyl acetal resin may be, for example, polyvinyl formal, polyvinyl acetal, or polyvinyl butylal.

Examples of the reactive material include, when the cross-linking agent is di- or polyisocyanate compound, the compounds such as polyvinyl alkylal, epoxy resins, acrylic resins containing a carboxyl group or groups, polyester resins, and fluororesins that are reactive to the above cross-linking agent.

The transparent high electric resistance layer may be obtained by means of laminating a film having high electric resistance with an adhesive or a bonding agent. The film having high electric resistance may be formed of, for example, polyethylene terephthalate, polyethylene naphthalate, polypropylene, polyethylene, polyvinyl chloride, polysulfone, polyphenylene oxide, ionomer, polycarbonate, nylon, fluororesins, silicon dioxide and so on.

In the driving power unit for the liquid crystal light-modulating device according to the present invention, the blocking oscillator circuit substantially comprises an oscillating transistor and an oscillating transformer for boosting and is to boost a low voltage of the low-voltage DC power source to a level of from 50 V to 2,000 V. The current flowing through the primary coil of the oscillating transformer for boosting is controlled to a level of 10 mA or less.

A dry battery or a solar battery may be used as the low voltage DC power source, and a dry battery of 1.5 V is preferable because of its good availability and easiness of handling. The oscillating transistor, the oscillating transformer for boosting and the rectifier diode are those commercially available and are not specific ones.

In the oscillating transformer for boosting, the ratio of winding number of the primary coil to that of secondary coil is determined depending on the relation between the input voltage and the desired output voltage. The smoothing capacitor used is a capacitor having a capacity suitable for the rectified voltage.

The liquid crystal light-modulating panel constituting the liquid crystal light-modulating device according to the present invention is to switch the transparent and opaque conditions depending on the presence or absence of the electric field applied to the liquid crystal-dispersed polymer layer. More specifically, the liquid crystal in the liquid crystal-dispersed polymer layer is finely dispersed into the polymer matrix, and the liquid crystal molecules are oriented along the wall of polymer. The light is scattered in the absence of the electric field because of the difference in refractive index between the polymer and the liquid crystal, and the liquid crystal light-modulating panel becomes thus cloudy and opaque. When the electric field is applied across the liquid crystal-dispersed polymer layer by applying the voltage to the liquid crystal light-modulating panel, the liquid crystal molecules are oriented in the direction of the electric field and the refractive index of the polymer becomes generally equal to that of the liquid crystal, so that the light is not scattered and the liquid crystal light-modulating panel goes in the transparent state. Once being in this state, the electric charge is kept between the upper and lower sides of the liquid crystal-dispersed polymer layer, even without application of the voltage, to generate the electric field continuously since the liquid crystal-dispersed polymer layer has the high volume resistivity. As a result, the liquid crystal light-modulating panel is maintained to be transparent. In order to change the panel to the former opaque state, both transparent conductive layers are electrically connected to each other to achieve the same potential level at both layers, thereby removing the electric charge to cancel the electric field. In this way the liquid crystal light-modulating panel is turned to the former opaque state.

The driving power unit for the liquid crystal light-modulating device according to the present invention is to boost a low voltage generated by the low-voltage DC power source to a level ranging from 50 to 2,000 V and is to apply the voltage between the electrodes of the liquid crystal light-modulating panel. Oscillation occurs through repetition of following three steps, thereby generating in the secondary coil a pulse-like voltage proportional to the ratio of winding number of the primary coil to that of the secondary coil:

(1) In response to the turning ON of the power switch, a current flows from the low-voltage DC power source to the primary coil connected to the collector of the oscillating transistor, and the current is induced in the coil connected to the base, increasing the current flowing through the collector.
(2) At a certain time instant, the saturation voltage between the collector and the emitter rapidly increases, dropping the voltage applied to the primary coil connected to the collector. This turns OFF the oscillating transistor. At this time the current is induced in the secondary coil by the energy accumulated in the oscillating transformer (core) for boosting.
(3) The current is again induced in the coil connected to the base due to the current induced in the secondary coil, which turns ON the oscillating transistor to flow the current through the primary coil connected to the collector. The pulse-like voltage is half-wave rectified by the diode and is accumulated in the capacitor. One output terminal of the capacitor is connected to one electrode of the liquid crystal light-modulating panel, and the other output terminal is connected to the other electrode of the panel to apply the voltage to the liquid crystal-dispersed polymer layer.

EXAMPLES

Example 1

An embodiment of the driving power unit for driving the LCD element according to the present invention is described with reference to FIG. 1.

FIG. 1 is a schematic circuit diagram illustrating a state where the driving power unit 1 for driving the LCD element according to this embodiment is used. The driving power unit in this figure has the configuration of the circuit designated by the broken line in FIG. 1. In FIG. 1, a reference numeral 2 designates a low-voltage DC power source which is an alkaline dry battery of 1.5 V in this embodiment. The power source 2 is connected to a power switch 3 and a smoothing capacitor 4 having a capacitance of 47 μF. Reference numerals 5, 6, and 7 are an oscillating transistor, a resistance of 56 KΩ, and a resistance of 560Ω, respectively. The resistance 7 is connected to an oscillating capacitor 8 having a capacitance of 0.22 μF. A reference numeral 9 is an oscillating transformer for boosting which has the winding number ratio of about 1:380. These components 4 to 9 form a blocking oscillator circuit. A reference numeral 10 designates a rectifier diode, and a reference numeral 11 is a smoothing capacitor having a capacitance of 330 pF. These components 2 to 11 form a DC-DC converter circuit. Reference numerals 12, 13, 14 and 15 designate current controlling resistances of 5.1 MΩ. Reference numerals 16, 17 and 18 designate output terminals.

Operation of the driving power unit 1 having the configuration described above is described below. When the power switch 3 is turned ON, the low-voltage DC power source 2 is connected to bias the base of the oscillating transistor 5 through the resistance 6. The capacitor 4 is for stabilizing the voltage of the low-voltage DC power source 2. When the current flows through the primary coil of the oscillating transformer for boosting 9 connected to the base of the oscillating transistor 5, the current flows through the primary coil of the oscillating transformer for boosting 9 connected to the collector side of the oscillating transistor 5. As a result, the collector current in the oscillating transistor 5 is increased to provide positive feedback at the primary coil of the oscillating transformer for boosting 9 connected to the base side of the oscillating transistor 5, and thus the oscillating transistor 5 is switched ON.

At a certain time instant, the voltage applied to the primary coil connected to the collector of the oscillating transistor 5 is decreased, and then the saturation voltage between the collector and the emitter of the oscillating transistor 5 rapidly increases. Thus, the oscillating transistor 5 is switched OFF. In this event, the energy accumulated in the core of the oscillating transformer for boosting 9 causes induction of the current in the secondary coil of the oscillating transformer for boosting 9. Thus, the voltage is generated at the secondary coil of the oscillating transformer for boosting 9. A value of the generated voltage is in proportion to the winding number ratio between the primary coil and the secondary coil of the oscillating transformer for boosting 9. This output voltage is half-wave rectified by the diode 10. The capacitor 11 is the one for smoothing.

The back swing of the current induced in the secondary coil of the oscillating transformer for boosting 9 again causes the induction of the current at the primary coil of the oscillating transformer for boosting 9 connected to the base side of the oscillating transistor 5, and thus the oscillating transistor 5 is switched ON. Then, the current flows through the primary coil connected to the collector of the oscillating transistor 5. The resistance 7 and the capacitor 8 are to determine constants at the oscillation. Repeated cycle of the operation described above continues the oscillation. In addition, the resistances 12, 13 are the current value controlling resistances intervening for preventing the electrical shock when the writing means 21 comes into contact with the conductive layer through the human body. The resistances 14, 15 are the current value controlling resistances intervening for preventing the electrical shock when the written image is erased with the erasing means 20.

The voltage across the output terminals 16, 18, was 560 V in output voltage when measured with the power switch 3 turned ON by using Digital High Tester 3231-01, available from Hioki E E Corp., connected to a high voltage probe 9014.

Next, as shown in FIG. 1, one output terminal 18 of the driving power unit 1 was connected to the conductive layer of the liquid crystal display element 19 in which a transparent high electric resistance layer, a liquid crystal-dispersed polymer layer where the liquid crystal was finely dispersed into the polymer matrix, and a transparent insulator layer were layered in order on the conductive layer. A conductive sponge as the erasing means 20 having the volume resistivity of $4\times10^3$ Ω·cm in 23° C. air at 50% RH was connected to the output terminal 17 which had the same electric potential as that of the output terminal 18. Further, a conductive sponge as the writing means 21 having the volume resistivity of $4\times10^4$ Ω·cm in 23° C. air at 50% RH was connected to the other output terminal 16 of the driving power unit 1.

With the power switch 3 of the driving power unit 1 being ON, writing operation was conducted on the surface of the LCD element 19 (namely, on the transparent insulator layer) with the writing means 21. Since the direct current voltage of 560 V was generated between the output terminals 18 and 16 (between the conductive layer and the writing means 21) by turning the power switch 3 on, the electric field was applied between the surface of the liquid crystal display element and the conductive layer in response to the writing on the surface of the LCD element with the writing means 21. The liquid crystal molecules in the liquid crystal-dispersed polymer layer were oriented in the direction of this electric field, so that the difference in light transmission into the liquid crystal board, or the difference in contrast of scattering portions of the liquid crystal board allowed to display the written image.

When erasing the written image with the erasing means 20, the written image was completely erased. Since the conductive layer has the same electric potential as that of the erasing means 20, the electric field applied between the surface of the LCD element and the conductive layer was neutralized and eliminated, so that the orientation of the liquid crystal molecules in the liquid crystal-dispersed polymer layer was canceled, and thus it became possible to erase the written image.

Though bringing the conductive layer and the writing means 21 into contact with the human body at the same time while the power switch 3 was in the turned on condition, there was no electrical shock. The current flowing through the output terminal 16 was 1 µA when measured with the digital high tester 3231-01 described above.

Further, while the power switch 3 was in the turned on condition, the current flowing through the primary coil of the oscillating transformer for boosting 9 was 3 mA when measured with the digital high tester 3231-01 described above. It was possible to display the written image on the LCD element 19 because of the less consumption of electricity of the alkaline battery even after leaving it for 300 hours with the power switch 3 being ON.

Since the driving power unit for the LCD element of the present invention has the configuration described above, it is relatively easy to be fabricated at a low cost.

Further, since the controlling resistance of 200 KΩ to 100 MΩ intervenes between the main capacitor and the output terminal to control the output current value to 5 mA or less, even if the human body becomes into direct contact with the output terminals, there is no electrical shock.

Moreover, since the current flowing through the primary coil of the oscillator circuit is controlled to 10 mA or less, the consumption of electricity at the continuing oscillation is small, and, in particular, when the dry battery is used as the low-voltage DC power source, there is no need to renew the dry battery for a long time.

Examples 2 to 5 and Comparative Examples 1 and 2

An embodiment of the liquid crystal light-modulating device according to the present invention is described with reference to FIGS. 2 through 4.

Example 2

<Fabrication of Liquid Crystal Light-modulating Panel>

A liquid crystal light-modulating panel 31 shown in FIG. 2 was fabricated as follows:

First, provided was a transparent conductive film (available from Daicel Chemical Industries, Ltd.; trade name: Celleck K-LC) 34 having an electrode 33 formed on the substrate 32. A solution having the following composition was coated on the electrode 33 as the liquid crystal-dispersed polymer layer 36 in which the liquid crystals 35 were dispersed in a state of independent drops. The coating was then dried and cured to form a dried film of 11 µm thick.

| Composition: | |
|---|---:|
| Vinyleck K-624 (available from Chisso Corporation; polyvinyl formal resin) 10% ethanol-toluene mixed solution | 1 g |
| Takenate D110N (available from Takeda Chemical Industries, Ltd; polyisocyanate) | 0.133 g |
| E44 (available from MERCK Corp.; nematic liquid crystal) | 0.133 g |

Figure 2:
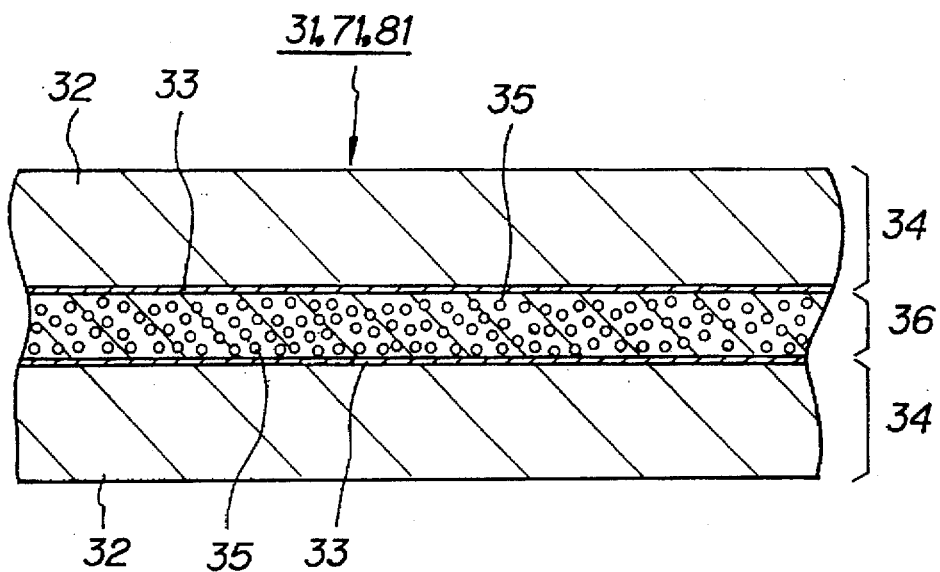
FIG. 2 is a schematic cross-sectional view showing a structure of a liquid crystal light-modulating panel in a liquid crystal light-modulating device according to an embodiment of the present invention.

On the liquid crystal-dispersed polymer layer 36 described above, the same transparent conductive film 34 as the above-described one was laminated with a hot melt adhesive and a laminator such that the electrode 33 of the film 34 was placed inward, and thus the liquid crystal light-modulating panel 31 shown in FIG. 2 was fabricated.

The volume resistivity was measured for the following layer adjusted in 20° C. air at a relative humidity of 90%, with a DC power supply (available from Torio KK.; PR-630), an electrometer (available form Takeda Riken Industry Co., Ltd.; TR8651), and an insulation resistant measuring specimen chamber (available from Advantest Corporation; TR42). The result was as follows.

| Liquid crystal-dispersed polymer layer | $1.2 \times 10^{14}$ Ω · cm |
|---|---|

The voltage of 500 V was applied to this liquid crystal light-modulating panel 31 with the DC voltage power source. The haze values of this liquid crystal light-modulating panel 31 were measured in transparent state and opaque state with a haze meter (available from Tokyo Densyoku Kabushiki Kaisha; TC-H III). As a result, following values were obtained.

| | |
|---|---|
| opaque state | Haze 91.5% |
| transparent state | Haze 18.6% |

<Fabrication of Driving Power Unit>

Figure 4:
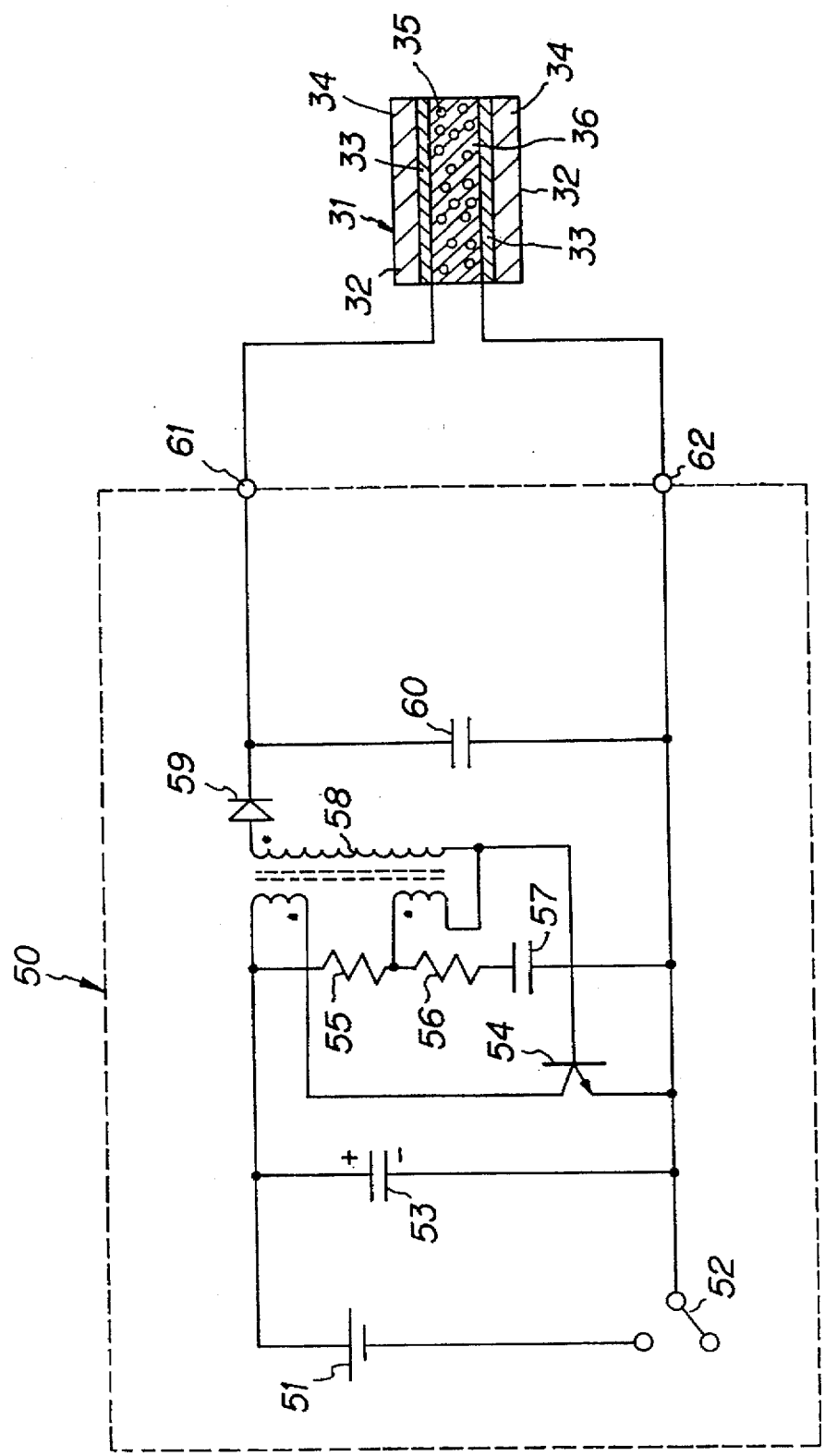
FIG. 4 is a schematic diagram showing a relation between a circuit diagram of a driving power unit and the liquid crystal light-modulating panel used for the liquid crystal light-modulating device of the present invention.

The driving power unit 50 for the liquid crystal light-modulating panel according to the present invention has a circuit as indicated within the broken line in FIG. 4. In FIG. 4, a reference numeral 51 designates a low-voltage DC power source which is an alkaline dry battery of 1.5 V in this embodiment. The power source 51 is connected to a power switch 52 and a smoothing capacitor 53 having a capacitance of 47 μF. A reference numeral 54 is an oscillating transistor. Reference numerals 55 and 56 are a resistance of 56 KΩ, and a resistance of 560Ω, respectively. The resistance 56 is connected to an oscillating capacitor 57 having a capacitance of 0.22 μF. A reference numeral 58 is an oscillating transformer for boosting which has the winding number ratio of about 1:380. These components 53 to 58 form a blocking oscillator circuit. A reference numeral 59 designates a rectifier diode, and a reference numeral 60 is a smoothing capacitor having a capacitance of 330 pF. These components 51 to 60 form a DC-DC converter circuit. Reference numerals 61 and 62 designate output terminals.

Operation of the driving power unit 50 having the configuration described above is described below. When the power switch 52 is turned ON, the low-voltage DC power source 51 is connected to bias the base of the oscillating transistor 54 through the resistance 55. The capacitor 53 is for stabilizing the voltage of the low-voltage DC power source 51. When the current flows through the primary coil of the oscillating transformer for boosting 58 connected to the base of the oscillating transistor 54, the current flows through the primary coil of the oscillating transformer for boosting 58 connected to the collector side of the oscillating transistor 54. As a result, the collector current in the oscillating transistor 54 is increased to provide positive feedback at the primary coil of the oscillating transformer for boosting 58 connected to the base side of the oscillating transistor 54, and thus the oscillating transistor 54 is switched ON.

At a certain time instant, the voltage applied to the primary coil connected to the collector of the oscillating transistor 54 is decreased, and then the saturation voltage between the collector and the emitter of the oscillating transistor 54 rapidly increases. Thus, the oscillating transistor 54 is switched OFF. In this event, the energy accumulated in the core of the oscillating transformer for boosting 58 causes induction of the current in the secondary coil of the oscillating transformer for boosting 58. Thus, the voltage is generated at the secondary coil of the oscillating transformer for boosting 58. A value of the generated voltage is in proportion to the winding number ratio between the primary coil and the secondary coil of the oscillating transformer for boosting 58. This output voltage is half-wave rectified by the diode 59. The capacitor 60 is the one for smoothing.

The back swing of the current induced in the secondary coil of the oscillating transformer for boosting 58 again causes the induction of the current at the primary coil of the oscillating transformer for boosting 58 connected to the base side of the oscillating transistor 54, and thus the oscillating transistor 54 is switched ON. Then, the current flows through the primary coil connected to the collector of the oscillating transistor 54. The resistance 56 and the capacitor 57 are to determine constants at the oscillation. Repeated cycle of the operation described above continues the oscillation.

The voltage between the output terminals 61 and 62, was 560 V in output voltage when measured with the power switch 52 of the driving power unit 50 turned ON by using Digital High Tester 3231-01, available from Hioki E E Corp., connected to a high pressure probe 9014. These output terminals 61 and 62 were connected to the electrodes 33 of the above mentioned liquid crystal light-modulating panel 31 to obtain the liquid crystal light-modulating device according to the present invention.

Example 3

<Fabrication of Memory-type Liquid Crystal Light-modulating panel>

The liquid crystal light-modulating panel 41 was fabricated as follows:

First, on the surface of the electrode 33 of the transparent conductive film 34 according to Example 2, the solution having the following composition was coated, which was then dried and cured to form a film of 1 μm thick as the transparent high electric resistance layer 37.

| | |
|---|---|
| Denka Formal #20 (available from Denki Kagaku Kogyo Kabushiki Kaisha; polyvinyl formal resin) 10% tetrahydrofuran solution | 3 g |
| Takenate D110N (available from Takeda Chemical Industry Co., Ltd.; polyisocyanate) | 0.133 g |

On this coating film, the liquid crystal-dispersed polymer layer 36 obtained in the same way as Example 2 and having the same composition as Example 2 was layered at a thickness of 13 μm.

Figure 3:
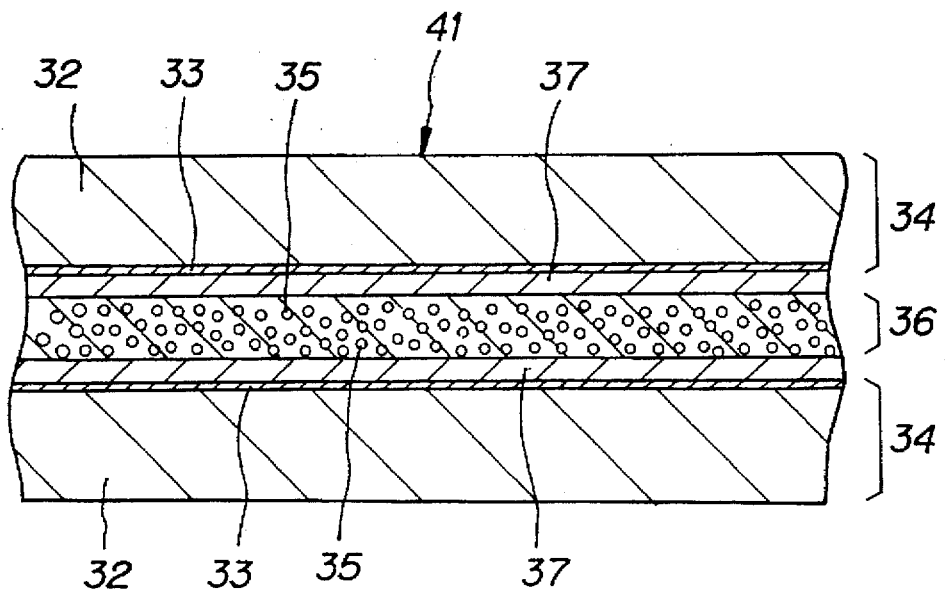
FIG. 3 is a cross-sectional view showing a structure of a liquid crystal light-modulating panel in a liquid crystal light-modulating device according to another embodiment of the present invention.

Further, on the liquid crystal-dispersed polymer layer 36, the film in which the transparent high electric resistance layer 37 was provided on the transparent conductive film 34 obtained in the same way as the above was laminated so that the transparent high electric resistance layer 37 could be in contact with the liquid crystal-dispersed polymer layer 36, and thus the liquid crystal light-modulating panel 41 shown in FIG. 3 was fabricated.

The volume resistivity of the following layers was measured in the same way as in Example 2.

| | |
|---|---|
| Transparent high electric resistance layer | $1.5 \times 10^{14}$ Ω · cm |
| Liquid crystal-dispersed polymer layer | $1.2 \times 10^{14}$ Ω · cm |

The haze values of this liquid crystal light-modulating panel 41 was measured in transparent state and opaque state in the same manner as in Example 2. As a result, the following values were obtained.

| | |
|---|---|
| opaque state | Haze 93.2% |
| transparent state | Haze 20.8% |

These output terminals 61 and 62 of the driving power unit 50 fabricated in the same manner as in Example 2 were connected to the respective electrodes 33 of the above mentioned liquid crystal light-modulating panel 41 to obtain the liquid crystal light-modulating device according to the present invention.

Example 4

<Fabrication of Memory-type Liquid Crystal Light-modulating Panel>

The procedure of Example 2 was repeated to fabricate the liquid crystal light-modulating panel 71 shown in FIG. 2 except that a solution having the following composition was applied, dried and cured so that the dried film thickness could be 11 μm to form the liquid crystal-dispersed polymer layer 36 in which liquid crystals 35 were dispersed in a state of independent drops.

| | |
|---|---|
| Vinyleck K-624 (available from Chisso Co., Ltd.; polyvinyl formal resin) 10% ethanol-toluene mixed solution | 1 g |
| Takenate D110N (available from Takeda Chemical Industry Co., Ltd.; polyisocyanate) | 0.133 g |
| E44 (MERCK Corp., made: nematic liquid crystal) | 0.2 g |

The volume resistivity of the following layer was measured in the same way as in Example 2.

| | |
|---|---|
| Liquid crystal-dispersed polymer layer | $1.2 \times 10^{13}$ Ω · cm |

Further, the haze values of this liquid crystal light-modulating panel 71 were measured in transparent state and opaque state in the same manner as in Example 2. As a result, the following values were obtained.

| | |
|---|---|
| opaque state | Haze 93.9% |
| transparent state | Haze 23.9% |

These output terminals 61 and 62 of the driving power unit 50 fabricated in the same manner as in Example 2 were connected to the respective electrodes 33 of the above mentioned liquid crystal light-modulating panel 71 to obtain the liquid crystal light-modulating device according to the present invention.

Example 5

<Fabrication of Memory-type Liquid Crystal Light-modulating Panel>

The procedure of Example 2 was repeated to fabricate the liquid crystal light-modulating panel 81 shown in FIG. 2 except that a solution having the following composition was applied, dried and cured so that the dried film thickness could be 12 μm to form the liquid crystal-dispersed polymer layer 36 in which liquid crystals 35 were dispersed in a state of independent drops.

| | |
|---|---|
| Vinyleck K-624 (available from Chisso Co., Ltd.; polyvinyl formal resin) 10% ethanol-toluene mixed solution | 1 g |
| Takenate D110N (available from Takeda Chemical Industry Co., Ltd; polyisocyanate) | 0.133 g |
| E44 (available from MERCK Corp.; nematic liquid crystal) | 0.133 g |
| M-370 (available from Mitsui Toatsu Dyes, Ltd.; bicolor) | 0.001 g |

The volume resistivity of the following layer was measured in the same way as in Example 2.

| | |
|---|---|
| Liquid crystal dispersed polymer layer | $1.2 \times 10^{14}$ Ω · cm |

Further, the haze values of this liquid crystal light-modulating panel 81 were measured in transparent state and opaque state in the same manner as in Example 2. As a result, the following values were obtained.

| | |
|---|---|
| opaque state | Haze 90.9% |
| transparent state | Haze 27.9% |

These output terminals 61 and 62 of the driving power unit 50 fabricated in the same manner as in Example 2 were connected to the electrodes 33 of the above mentioned liquid crystal light-modulating panel 81 to obtain the liquid crystal light-modulating device according to the present invention.

Comparative Example 1

<Fabrication of Liquid Crystal Light-modulating Panel>

A solution having the following composition was applied on the surface of the electrode of the same transparent conductive film as that obtained in Example 2, and then the same conductive film as the above was laminated on the applied film. Subsequently, the films were pressurized to form constant gaps between the films.

| | |
|---|---|
| Trimethylol propane triacrylate | 1.2 g |
| n-butyl acrylate | 1.8 g |
| Benzoin isopropyl ether | 0.06 g |
| E8 (available from MERCK Corp.; nematic liquid crystal) | 7.0 g |
| MBX-12S (available from Sekisui Plastics Co., Ltd.; 12 μm spherical particle) | 0.005 g |

An ultraviolet ray of 1.5 mW/cm$^2$ was irradiated from a 400-W mercury lamp for 1 minute to the laminated film described above. As a result, the other components except the liquid crystal in the mixture were cured to separate from the liquid crystal, and an opaque liquid crystal light-modulating panel was obtained.

The volume resistivity of the following layer was measured in the same way as in Example 2.

| | |
|---|---|
| Liquid crystal-dispersed polymer layer | $5.6 \times 10^{9}$ Ω · cm |

Further, the voltage of 50 V was applied to this liquid crystal light-modulating panel by using an AC voltage supply to measure the haze values of this liquid crystal light-modulating panel in transparent state and opaque state in the same manner as in Example 2. As a result, the following values were obtained.

| | |
|---|---|
| opaque state | Haze 92.9% |
| transparent state | Haze 23.5% |

Comparative Example 2

<Fabrication of Liquid Crystal Light-modulating Panel>

The procedure of Example 2 was repeated except that a solution having the following composition was emulsified with an ultrasonic wave dispersing device such that the liquid crystal drops could have the average particle diameter of 1 μm and then the resultant emulsion was then applied, dried to form the liquid crystal-dispersed polymer layer having the dried film thickness of 13 μm. Finally, the liquid crystal light-modulating panel was fabricated.

| | |
|---|---|
| Gohsenol GH-17 (available from Nippon Synthetic Chemical Industry Co., Ltd.; polyvinyl alcohol) 7% aqueous solution | 0.86 g |
| E7 (available from MERCK Corp.; nematic liquid crystal) | 0.14 g |
| Unidain DS-301 (available from Daikin Chemical Industry Co., Ltd.; fluorine-based surface active agent) | 0.001 g |

The volume resistivity of the following layer was measured in the same way as in Example 2.

| | |
|---|---|
| Liquid crystal dispersed polymer layer | $3.1 \times 10^{10} \ \Omega \cdot cm$ |

Further, the voltage of 200 V was applied to this liquid crystal light-modulating panel by using an AC voltage supply to measure the haze values of this liquid crystal light-modulating panel in transparent state and opaque state in the same manner as in Example 2. As a result, the following values were obtained.

| | |
|---|---|
| opaque state | Haze 94.2% |
| transparent stated | Haze 25.5% |

<Evaluation on Liquid Crystal Light-modulating Panels>

The following examination and evaluation were executed with regard to the memory characteristics and durability of the individual liquid crystal light-modulating panels of the above examples and comparative examples.

(1) Memory Characteristics

In dried condition: A DC voltage was applied for one second from the driving power unit to the each liquid crystal light-modulating panel to make it transparent, then the application of the voltage was stopped, leaving it in the room environment (in 20° C. air at a relative humidity of 50%). In this state, the haze value of the panel was measured every 10 minutes, and evaluation of the panels was executed in accordance with the time when the haze value exceeds 30%. In addition, the Comparative Examples 1 and 2 were driven by applying a DC voltage so as to have the equal transparency to that in the case of driving by the normal AC voltage.

In humid condition: Each liquid crystal light-modulating panel was adjusted in 20° C. air at a relative humidity of 90%, following which the voltage was applied to drive the panel in the same manner as in the case of the dried condition. The panels were then left in a high humidity environment (in 20° C. air at a relative humidity of 90%). The haze value was measured to evaluate the panels in the same manner as in the case of the dried condition.

Evaluation result:

O . . . The time when the haze value exceeded 30% was 30 minutes or more;

Δ . . . The time when the haze value exceeded 30% was less than 30 minutes;

X . . . The haze value exceeded 30% immediately after stopping the application of the voltage.

(2) Durability

In dried condition:

A DC voltage having the same voltage as the driving voltage was applied to the individual liquid crystal light-modulating panels continuously for 30 minutes. These panels were evaluated according to whether or not any change such as discoloration was found by visual observation.

Note) The Comparative Examples 1 and 2 were driven by applying a DC voltage continuously for 30 minutes so as to have the equal transparency to that in the case of driving by the normal AC voltage.

Evaluation results:

O . . . No changes

Δ . . . Changes were recognized when carefully observing

X . . . Changes were clearly recognized (3) Power Consumption of Panels

Each liquid crystal light-modulating panel having a predetermined area was driven to determine, according to the volume resistivity, a power consumption per unit time ($W \cdot H/cm^2$) required for keeping a transparent state for 30 minutes with the haze value of less than 30%. The results were compared and considered. In addition, the panels of Examples 2 to 5 were applied with the DC voltage for one second and were then left. The panels of Comparative Examples 1 and 2 were continuously applied with the normal AC voltage.

The evaluation results regarding the liquid crystal light-modulating panels obtained by the above examples and comparative examples are shown in table 1.

TABLE 1

| | Memory characteristics | | Durability | | Power consumption |
|---|---|---|---|---|---|
| | Dried | Humid | Dried | Humid | ($W \cdot H/cm^2$) |
| Examples | | | | | |
| 2 | O | O | O No change | O No change | $1.05 \times 10^{-10}$ |
| 3 | O | O | O No change | O No change | $7.44 \times 10^{-11}$ |
| 4 | O | Δ | O No change | Δ A little discoloring of electrodes | $1.05 \times 10^{-9}$ |
| 5 | O | O | O No change | O No change | $9.67 \times 10^{-11}$ |
| Comparative Examples | | | | | |
| 1 | X | X | X Discoloring to brown of electrodes | X Discoloring to brown of electrodes | $3.72 \times 10^{-5}$ |
| 2 | X | X | X Discoloring to brown of electrodes | X Discoloriong to brown of electrodes | $9.93 \times 10^{-5}$ |

<Evaluation for Driving Power Source>

The evaluation was executed for the power consumption of the driving power unit according to the present invention. The current flowing through the primary coil of the oscillating transformer for boosting was measured with the power switch turned ON by using the above-mentioned digital high tester 3231-01. The measurement was 3 mA. The output terminals were removed from the electrodes of the liquid crystal light-modulating panel, following which the driving power unit was left for 300 hours with the power switch still turned ON. Subsequently, the output terminals were again connected to the electrodes of the liquid crystal light-modulating panel and a DC voltage was applied thereto. Since the alkaline dry battery consumed less power, it was possible to turn the above memory type liquid crystal light-modulating panel into the transparent state with the haze value of less than 30%, confirming that the driving power unit consumed less power.

Since the liquid crystal light-modulating device of the present invention is equipped with the liquid crystal light-modulating panel provided with the liquid crystal-dispersed polymer layer having the volume resistivity of $10^{13}$ 106 ·cm or more in 20° C. air at a relative humidity of 90%, it is possible to maintain continuously the transparent state by the instant application of a DC voltage. There is thus no need to continue application of an AC voltage, reducing the power consumption required for maintaining the transparent state compared with the conventional liquid crystal light-modulating device.

Further, since the insulating characteristics of the liquid crystal-dispersed polymer layer are high even in the humid condition, an electric current is hard to flow in the liquid crystal-dispersed polymer layer. The liquid crystal and the electrodes do not deteriorate due to the reaction between the liquid crystal and the electrodes, although the deterioration of this type is often seen in a liquid crystal light-modulating panel used for the conventional liquid crystal light-modulating device. Accordingly, there is obtained the liquid crystal light-modulating device provided with the liquid crystal light-modulating panel having high durability.

Furthermore, since the volume resistivity of the liquid crystal-dispersed polymer layer is high even in the humid condition and the performance does not deteriorate, there is no need to interpose the light-modulating panel between the grass plates and to seal the cross section to prevent water from penetrating unlike the liquid crystal light-modulating panel used for the conventional liquid crystal light-modulating device, so that it is possible to provide the light-modulating panel in a state of film. The liquid crystal light-modulating device of the present invention can be manufactured at a low cost compared with the conventional liquid crystal light-modulating device because the driving power unit has a relatively simple structure. The liquid crystal light-modulating device of the present invention has also various uses in comparison with the conventional one, since the liquid crystal light-modulating panel can be made light and flexible and the driving power unit can be also made compact by the use of a dry battery.

Still further, in the liquid crystal light-modulating device according to the present invention, it is possible to reduce the power consumption at the oscillation by controlling the current flowing in the primary coil of the oscillator circuit in the driving power unit to 10 mA or less, and, in particular, when the dry battery is used as the low voltage power source, there is no need to renew the dry battery for a long time, so that there is an advantage that it is possible to reduce running costs.

What is claimed is:

1. A driving power unit for driving a liquid crystal display element which charges an electrostatic charge on a surface of the liquid crystal display element having at least a conductive layer and a liquid crystal-dispersed polymer layer in which a liquid crystal is finely dispersed into a polymer matrix, said driving power unit comprising:

a low-voltage DC power source;

a power switch;

a blocking oscillator circuit for boosting a low voltage generated by said low-voltage DC power source, said blocking oscillator circuit including a transistor having a base, collector, and emitter and a transformer having a secondary winding and a first primary winding, wherein the base of the transistor is electrically connected to the secondary winding and the first primary winding;

a rectifier diode for rectifying the voltage boosted by the blocking oscillator circuit;

a smoothing capacitor for being charged by application of the rectified voltage and smoothing an output voltage; and a resistive element interconnected between said smoothing capacitor and an output terminal to control an output current value to 5 mA or less.

2. The driving power unit for driving a liquid crystal display element according to claim 1, wherein the transformer has a second primary winding.

3. The driving power unit for driving a liquid crystal display element according to claim 1, wherein the blocking oscillator circuit boosts a low voltage generated by the low-voltage DC power source to a level ranging from 50 to 2,000 V.

4. The driving power unit for driving a liquid crystal display element according to claim 2, wherein a current flowing through the first primary winding of the transformer is 10 mA or less.

5. The liquid crystal light-modulating device according to claim 2, wherein the collector is connected to the second primary winding.

6. A liquid crystal light-modulating device comprising:

(A) a liquid crystal light-modulating panel comprising a pair of electrodes at least one of which is transparent or translucent, and a liquid crystal-dispersed polymer layer sandwiched between the electrodes, wherein a liquid crystal is finely dispersed into a polymer matrix; and (B) a driving power unit for applying a direct current voltage between the electrodes and driving the liquid crystal light-modulating panel, comprising a low-voltage DC power source, a power switch, a blocking oscillator circuit for boosting a low voltage generated by the low-voltage DC power source, said blocking oscillator circuit including a transistor having a base, collector, and emitter and a transformer having a secondary winding and a first primary winding, wherein the base of the transistor is electrically connected to the secondary winding and the first primary winding, a rectifier diode for rectifying the voltage boosted by the blocking oscillator circuit, and a smoothing capacitor for being charged by application of the rectified voltage and smoothing an output voltage.

7. The liquid crystal light-modulating device according to claim 6, wherein the liquid crystal is a nematic liquid crystal having a positive dielectric anisotropy.

8. The liquid crystal light-modulating device according to claim 6, wherein the liquid crystal-dispersed polymer layer has a volume resistivity of $10^{13}$ Ω·cm or more in 20° C. air at a relative humidity of 90%.

9. The liquid crystal light-modulating device according to claim 6, wherein a transparent high electric resistance layer having a volume resistivity of $10^{13}$ Ω·cm or more in 20° C. air at a relative humidity of 90% is sandwiched between the liquid crystal-dispersed polymer layer and the electrode.

10. The liquid crystal light-modulating device according to claim 9, wherein the transparent high electric resistance layer comprises polymer having a cross-linking structure.

11. The liquid crystal light-modulating device according to claim 9, wherein the transparent high electric resistance layer is in the form of a film.

12. The liquid crystal light-modulating device according to claim 6, wherein the liquid crystal is dispersed into the polymer matrix in a state of independent drops.

13. The liquid crystal light-modulating device according to claim 8, wherein the liquid crystal is dispersed into the polymer matrix in a state of independent drops.

14. The liquid crystal light-modulating device according to claim 6, wherein the polymer matrix has a cross-linking structure.

15. The liquid crystal light-modulating device according to claim 6, wherein the transformer has a second primary winding.

16. The liquid crystal light-modulating device according to claim 6, wherein the blocking oscillator circuit boosts a low voltage generated by the low-voltage DC power source to a level ranging from 50 to 2,000 V.

17. The liquid crystal light-modulating device according to claim 15, wherein a current flowing through the first primary winding of the transformer is 10 mA or less.

18. The liquid crystal light-modulating device according to claim 15, wherein the collector is connected to the second primary winding.

* * * * *

UNITED STATES PATENT AND TRADEMARK OFFICE
CERTIFICATE OF CORRECTION

PATENT NO. : 5,712,692

DATED : January 27, 1998

INVENTOR(S) : Yutaka ABE, Takao YAMAGUCHI, Masahiko IKEDA, Morio SATO and Hiroshi TAZAKI It is certified that error appears in the above-identified patent and that said Letters Patent is hereby corrected as shown below:

Title Page, delete "Kanagawa et al" and insert therefor --Abe et al--.

Section [75], delete "Yutaka Abe Kanagawa" and insert therefor --Yutaka Abe--.

Section [73], delete "Tokyto-to-- and insert therefor --Tokyo-to--.

Signed and Sealed this

Twelfth Day of May, 1998

Attest:

BRUCE LEHMAN

Attesting Officer

Commissioner of Patents and Trademarks